United States Patent [19]

Fischer et al.

[11] Patent Number: 5,145,653
[45] Date of Patent: Sep. 8, 1992

[54] DEVICE FOR GENERATING OZONE

[75] Inventors: Melchior Fischer, Lieli; Helmut Lang, Wettingen, both of Switzerland

[73] Assignee: Ozonia AG,, Zurich, Switzerland

[21] Appl. No.: 669,995

[22] Filed: Mar. 15, 1991

[30] Foreign Application Priority Data

Mar. 29, 1990 [CH] Switzerland ............... 1042/90

[51] Int. Cl.⁵ ............................................. B01J 19/08
[52] U.S. Cl. ........................... 422/186.18; 422/186.07
[58] Field of Search ................ 422/186.07, 186.13, 422/186.18, 186.19, 186.2, 907

[56] References Cited

U.S. PATENT DOCUMENTS

| 882,509 | 3/1908 | Wood | 422/186.07 |
| 882,510 | 3/1908 | Wood | 422/180.07 |
| 4,214,995 | 7/1980 | Saylor et al. | 250/539 |
| 4,650,648 | 3/1987 | Beer et al. | 422/186.07 |
| 4,886,645 | 12/1989 | Fischer et al. | 422/186.18 |
| 4,986,968 | 1/1991 | Hirth et al. | 422/186.19 |

FOREIGN PATENT DOCUMENTS 313802  5/1989  European Pat. Off. .
385177  9/1990  European Pat. Off. .

Primary Examiner—Brooks H. Hunt
Assistant Examiner—Daniel J. Jenkins
Attorney, Agent, or Firm—Oblon, Spivak, McClelland, Maier & Neustadt

[57] ABSTRACT

In ozone generators having segmented inner electrodes (7), the electric connection of the segments is effected by means of plane contact areas (10) applied to the ends of the segments. A tension rod (11) passing through all segments ensures cohesion and, at the same time, is used as the connecting element for supplying the ozone generator with power.

11 Claims, 3 Drawing Sheets

DEVICE FOR GENERATING OZONE

BACKGROUND OF THE INVENTION

1. Field of the Invention

The invention relates to a device for generating ozone from oxygen or from an oxygen containing gas by silent electric discharges in a discharge gap through which the gas flows and which is essentially formed by a tubular outer electrode and by tubular inner electrodes provided with a dielectric and concentrically surrounded by the outer electrode, which are electrically connected to one another, and a means for spacing the dielectric from the outer electrode.

In this connection, the invention relates to a prior art as is found, for example, in EP-A-0313 802.

2. Discussion of Background

Ozone is a very strong oxidant for organic substances and for inorganic compounds containing elements having several oxidation states. Apart from a large variety of applications in chemistry, it has been used for decades in water conditioning. Although there are theoretically many possibilities for generating ozone, only ozone generation by means of silent electric discharge has hitherto claimed any significance in practice.

In contrast to plate-type ozone generators, tubular ozone generators present problems in ensuring accurate spacing between the electrodes. This is mainly caused by dimensional deviations of the tube diameters, and bending. Segmentation of the inner tubes according to EP-A-0313 802 provides a remedy in this case. Instead of one tube, two or more inner tubes are provided which are supported and spaced independently from one another in the outer tube. However, segmentation entails an increased complexity in electrically connecting the inner tubes.

BRIEF DESCRIPTION OF THE DRAWINGS

Starting from the prior art, the invention is based on the object of creating a device for generating ozone, in which the electric connection between the inner tubes and their connection to the power supply are simplified.

According to the invention, this object is achieved by the fact that the inner tubes are provided at the end with contact areas at the ends and are held together at least group by group by clamping means acting in the longitudinal direction of the tube.

The contact arrangement according to the invention is particularly suitable for inner tubes which are coated with an enamel-based or plastic-based dielectric.

BRIEF DESCRIPTION OF THE DRAWINGS

Figure 1:
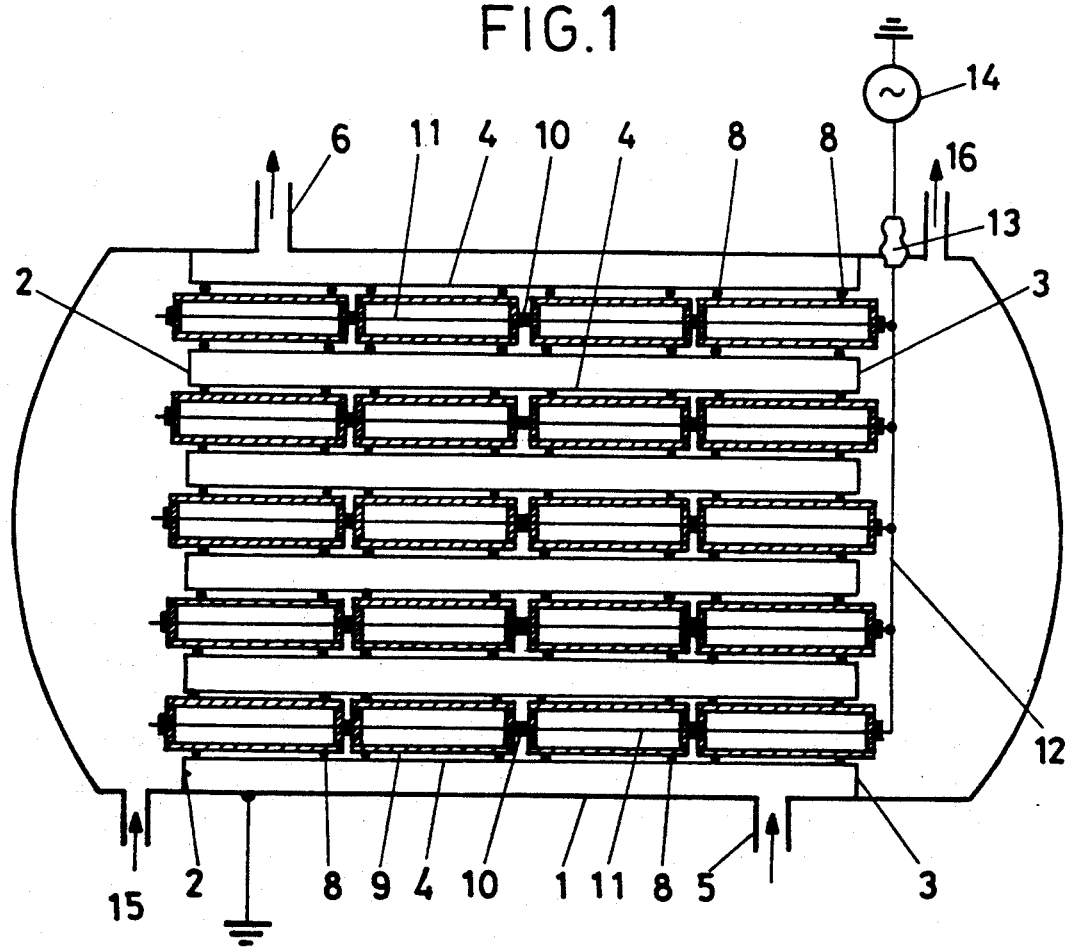
Figure 5:
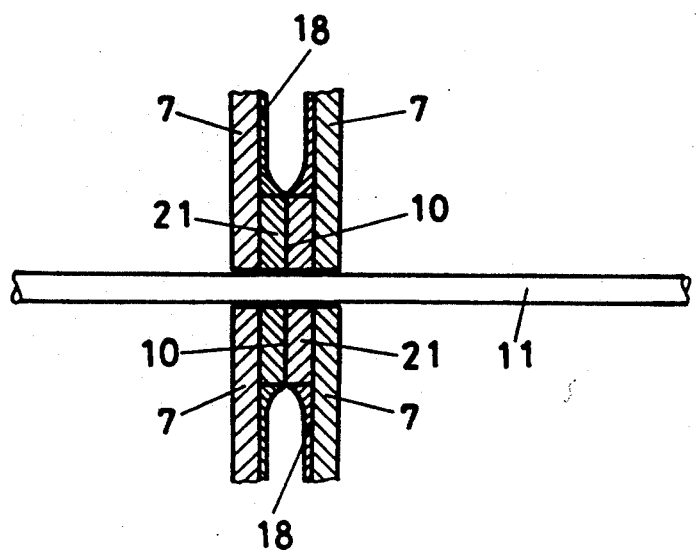
Figure 2:
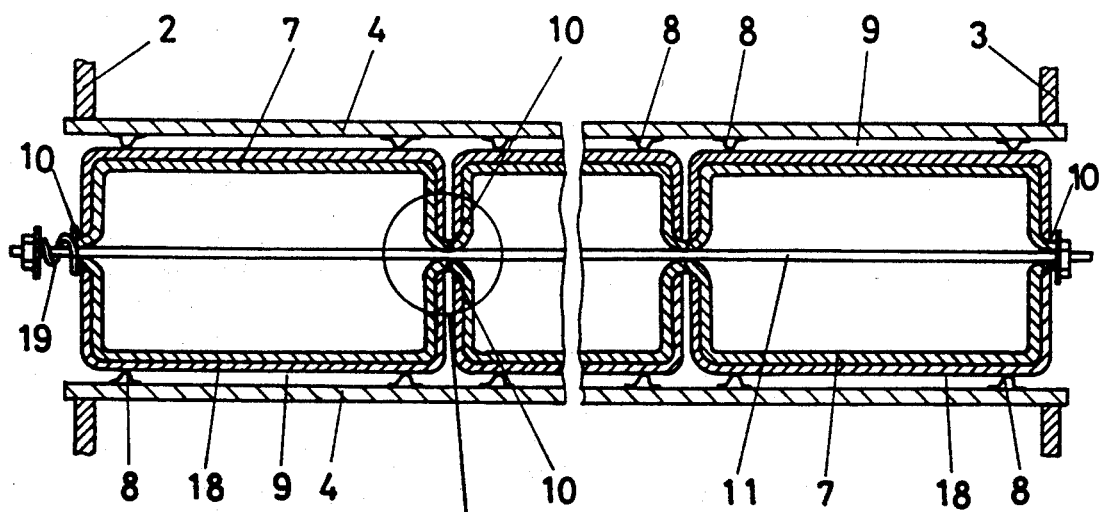
Figure 3:
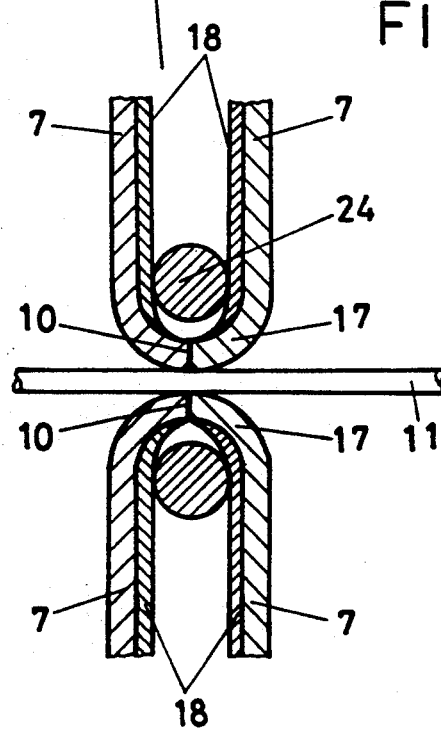
Figure 4:
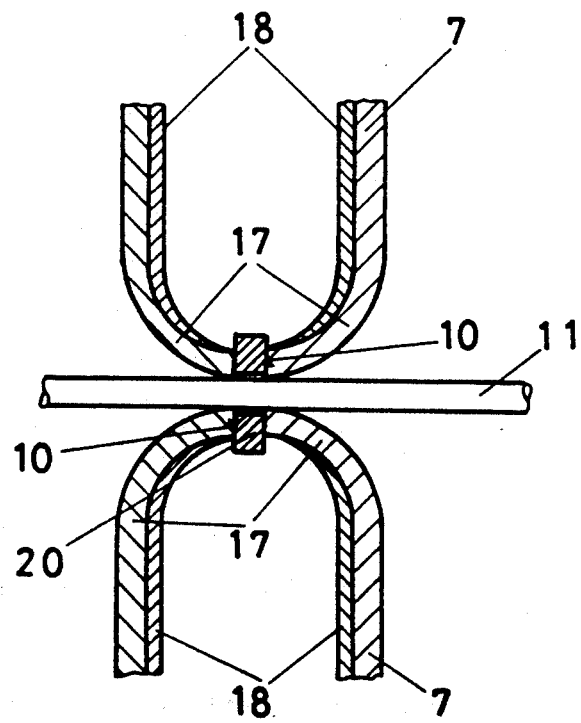
Figure 6:
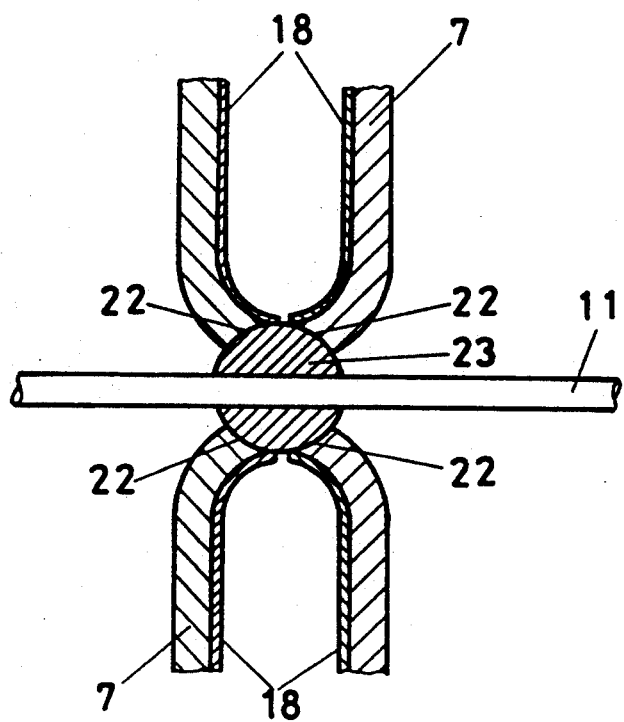

A more complete appreciation of the invention and many of the attendant advantages thereof will be readily obtained as the same becomes better understood by reference to the following detailed description when considered in connection with the accompanying drawings, in which:

FIG. 1 shows a greatly simplified longitudinal section through an ozone generator having segmented inner electrodes;

FIG. 2 shows an enlarged, more detailed cross section through an element of the ozone generator according to FIG. 1;

FIG. 3 shows an enlarged section from FIG. 2, which shows the contact point between two inner tubes;

FIG. 4 shows a modification of the contact point in FIG. 3 having a ductile metal disk between two adjoining tubes;

FIG. 5 shows a modification of the contact point in FIG. 3 and FIG. 4, respectively, having separate contact disks on each end; and FIG. 6 shows a further modification of the invention with contact faces which, at the same time, also have a centering function.

DESCRIPTION OF THE PREFERRED EMBODIMENTS

Referring now the drawings, wherein like reference numerals designate identical or corresponding parts throughout the several views, FIG. 1 shows in a greatly simplified representation an ozone generator as it is currently constructed for industrial use.

In a boiler 1, a plurality of elements are accommodated. The boiler has at its ends partition walls 2, 3 into which metal tubes 4 are welded. These metal tubes 4 form the outer electrodes (connected to ground potential) of each element. Only five tubes are drawn in, for reasons of clarity; in practice, there can be 100 or more tubes. At the points where they are welded into the partition walls 2, 3, the tubes are sealed with respect to the interior of the boiler. A coolant, for example water, which is used for external cooling of the metal tubes 4, is conducted into the interior of the boiler and removed from it via stubs 5, 6 in the boiler wall. In the case of the example, four segmented inner tubes 7 or metal which are provided with an outer dielectric layer are inserted into the metal tubes 4. The inner tubes are each spaced apart from the metal tubes 4 by two spacing elements 8 and leave annular discharge gaps 9 between themselves and the metal tubes 4. Contact between the inner electrodes 7 among themselves and the outer connection to the power supply are effected via contact areas 10 at the ends of the inner tubes 7. A metallic tension rod 11 is used for clamping together all the inner tubes 7 of one element and, at the same time, as a connecting element to a busbar 12. The busbar 12 is connected via an electric feed-through 13 to one terminal of an alternating-current source 14 with adjustable frequency and/or amplitude and/or waveform, the other terminal of which is connected to ground potential. The oxygen containing operation gas is supplied to the ozone generator via a gas inlet stub 15 and leaves the boiler again through the gas outlet stub 16.

The detailed construction of the inner tubes 7 and their electric contact arrangement is illustrated in greater detail in FIG. 2 and FIG. 3. Apart from two central holes in the ends, the inner tube is closed. It consists of steel or stainless steel and is provided at both ends with a bulge 17 in the center of which the hole is located. The inner tubes 7 are coated with an outer single- or multi-layer enamel layer 18 as is described, for example, in European Patent Application 9010279.4 by the applicant of 13.2.1990. Alternatively, the dielectric consists of dielectric powders of different grain size and bonding with synthetic resin. Details about construction and advantageous characteristics of such plastic-based dielectrics are described, for example, in DE-A-3442 121 or in U.S. Pat. No. 4,650,648.

To achieve an (electric) contact area 10 at the end of the inner tube, the dielectric layer 18 has been subsequently removed around the said hole in the bulges 17, or this area was left untouched when the dielectric was applied. In addition, the contact areas 10 are ground flat so that they are orthogonal with respect to the longitudinal axis of the tube. The inner tubes 7, four in the case of the example, are clamped together by the tension rod 11 which exhibits a spring 19 at one or both ends. The diameter of the tension rod 11 is smaller by only a few tenths of a millimetre, and thus of the order of magnitude of the width of the discharge gap 9, than the diameter of the said holes in the ends of the tubes 7. In this arrangement, the definitive clamping occurs only when the inner tubes 7 have been inserted into the metal tubes 4 and are spaced in them. The machined contact areas 10 and the central location of the holes in this arrangement ensure that the required homogeneity of the discharge gap 9 is maintained.

If the contact areas 10 are not sufficiently plane-parallel, for example for cost reasons, tolerances can be compensated for by interposition of ductile metal disks 20, preferably of gold-plated soft-annealed copper, according to FIG. 4. In this connection, the electric contact between adjacent inner tubes 7 is less important than the suppression of unwanted leakage currents from the discharge gap into the interior for the tube 7. Another possibility for suppressing such leakage currents (in the case of contact areas 10 which are not plane-parallel) consists of inserting a plastic ring 24, preferably of soft PTFE, between two adjacent inner tubes 7 as is illustrated in FIG. 3.

Instead of bulges 17 at both ends of the inner tube 7, separate contact areas can also be created there as is illustrated in FIG. 5. Disks 21, which exhibit holes which line up with the holes in the inner tube 7, are soldered or welded onto the ends of the inner tube 7. Here, too, it is true that the dielectric is subsequently removed from the free ends of the disks 21 or these areas have been left out during the coating.

If the tolerances are too great, a plastic ring, as has been described in conjunction with FIG. 3, can also be additionally used in this case in order to suppress leakage currents from the discharge gap into the interior of the tube 7.

FIG. 6, finally, shows an embodiment of the invention in which the contact areas, in conjunction with a contact body threaded onto the tension rod 11, can also handle centering functions in addition to the electric connection between two adjacent tubes. For this purpose, central hemispherical recesses 22 are formed in the ends of adjacent inner tubes 7 which act in conjunction with a spherical contact body 23 which is placed onto the tension rod 11. Instead of the hemispherical shape, the recesses 22 can also be constructed to be extending conically inward. It would also be possible to provide a recess at one end of one inner tube 7 and a correspondingly shaped protrusion at the end of the other immediately adjacent inner tube 7. In both cases, it may then be possible to omit spacing elements 8 at one inner tube end each of two adjacent inner tubes 7.

This solution is suitable both for the case of an inner tube with bulges 17 shown and for the solution involving contact disks 21 according to FIG. 5.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for generating ozone from oxygen or an oxygen containing gas, comprising:
    a plurality of tubular inner electrodes having adjoining ends arranged end-to-end;
    an electrical contact area formed at each adjoining end of said plurality of inner electrodes;
    a dielectric layer coating an outer periphery of each of said plurality of inner electrodes;
    a tubular outer electrode concentrically surrounding said plurality of inner electrodes;
    means for spacing said outer electrode from said inner electrodes to form a discharge gap between said outer electrode and said dielectric layer; and
    a clamping means for axially compressing said plurality of inner electrodes toward one another to provide electrical and mechanical connection of said inner electrodes at said adjoining ends.

2. A device as claimed in claim 1, wherein the electrical contact area comprises a planar surface extending orthogonally with respect to a longitudinal axis of the inner electrodes.

3. A device as claimed in claim 1 or 2, wherein adjacent inner electrodes directly contact one another at said adjoining ends.

4. A device as claimed in claim 1 or 2, wherein a contact disk of ductile material is provided between two of said adjoining ends.

5. A device as claimed in claim 1 or 2, further comprising a contact disk attached to each of said adjoining ends, said electrical contact area being formed on said contact disk.

6. A device as claimed in claim 1, further comprising a contact body interposed between two of said adjoining ends, said contact body having an external surface contour complementary to a contour of said adjoining ends of said adjacent inner electrodes.

7. A device as claimed in claim 1 or 6, wherein a recess is formed in the adjoining end of at least one of said tubular electrodes.

8. A device as claimed in claim 7, wherein said contact body serves as said means for spacing said outer electrode from said inner electrodes.

9. A device as claimed in claim 8, wherein said contact body has a hemispherical shape.

10. A device as claimed in any of claims 1, 2 or 6, wherein said clamping means comprises a tension rod passing through each of said inner electrodes.

11. A device as claimed in claim 10, wherein said clamping means further comprises a spring urging said inner tubular electrodes into contact with one another along said tension rod.

* * * * *